United States Patent Office 3,544,478
Patented Dec. 1, 1970

3,544,478
METHOD FOR PRODUCING EUROPIUM ACTIVATED YTTRIUM OXIDE PHOSPHORS
Eugene A. Graff, Cedar Grove, N.J., assignor to Westinghouse Electric Corporation, Pittsburgh, Pa., a corporation of Pennsylvania
No Drawing. Continuation-in-part of application Ser. No. 721,569, Apr. 16, 1968. This application Feb. 18, 1969, Ser. No. 800,272
Int. Cl. C09k 1/10
U.S. Cl. 252—301.4                                 6 Claims

ABSTRACT OF THE DISCLOSURE

Method of preparing europium-activated yttrium oxide phosphor composition by firing the oxides with chlorine containing fluxes. The luminescent brightness of phosphors prepared by this method compares with what was previously only achievable by the more costly and inefficient techniques in which rare-earth metal oxalates were precipitated and fired.

CROSS-REFERENCE TO RELATED APPLICATION

This application is a continuation-in-part of application Ser. No. 721,569, now abandoned, filed Apr. 16, 1968, by the present inventor, and owned by the present assignee.

BACKGROUND OF THE INVENTION

The red emitting europium-activated yttrium oxide phosphor is an important commercial phosphor, which can be used with cathode ray tubes and fluorescent lamps. The best prior art preparation technique for very bright commercially useful mixed rare-earth metal oxide phosphors consists of coprecipitating the rare-earth metals as oxalates, and then firing the coprecipitate with or without a fluxing compound. The prior art also includes production of europium-activated yttrium oxide using alkaline-earth metal halide flux in an amount of 25 to 400 percent by weight of the phosphor as described in U.S. Pat. 3,368,980.

The oxalate precipitation technique involves dissolving the rare-earth metal oxides in solution, maintaining the solution at a relatively dilute concentration of rare-earth metal, and coprecipitating the rare-earth metal using large amounts of oxalating compound. The solutions utilized in the oxalate precipitation method require bulky mixing tanks and facilities. The raw material cost of the dissolving solution for the rare-earth metals, and the oxalating compound increases the cost of phosphor production. Other mixed rare-earth metal oxide phosphor compositions have been similarly prepared using the oxalate precipitation technique in order to achieve high levels of luminescent brightness.

Various halogen-containing compounds, including ammonium chloride, and zinc chloride have been used as fluxes with various phosphor compositions.

SUMMARY OF THE INVENTION

It is an object of the invention to provide a more efficient method of preparing very high quality luminescent europium-activated yttrium oxide phosphor, which exhibits a brightness level comparable to or better than the phosphor quality previously achievable only by more expensive and inefficient production techniques.

The aforesaid object and others which will become apparent as the description proceeds are achieved by utilizing europium and yttrium oxides in the desired proportions in the raw mix, and adding thereto a predetermined amount of a flux of the group consisting of zinc chloride or ammonium chloride. The resulting raw mix is fired under predetermined conditions to complete the phosphor preparation. It has been found that the selected halogen-containing compounds are preferred in an amount such that the halogen is present in the raw mix in an amount of at least one percent by weight of the europium and yttrium oxides. The raw mix is preferably fired at about 1300° C. for about six hours either in a covered crucible with a surrounding oxidizing atmosphere or in an oxidizing atmosphere. In the preferred embodiment, zinc chloride is the flux, and is added in an amount such that the chlorine is present in an amount of about 10 percent by weight of the metal oxides in the raw mix.

DESCRIPTION OF THE PREFERRED EMBODIMENT

As an example of the present invention, finely divided $Y_2O_3$ in an amount of about one mole (225.8 grams) is mixed with about 0.0675 mole (23.66 grams) of $Eu_2O_3$, and 47.7 grams of $ZnCl_2$. The resulting raw mix is placed in a suitable non-reactive, high-temperature-resistant, covered crucible, which is for example formed of silica, and fired with an atmosphere surrounding the crucible which comprises oxygen, and preferably air. Alternatively, the crucible can be left uncovered and the firing carried out in an atmosphere comprising oxygen, and preferably air. It should be noted that the use of the covered crucible has resulted in an improvement of about 5% relative brightness for the resulting phosphor as compared to the phosphor prepared by firing in the uncovered crucible. In either case, the firing is preferably carried out at about 1300° C. for about six (and one-half to seven) hours for the batch size indicated, with the larger the batch size, the longer the firing time. The resulting phosphor, after cooling, is washed in a 0.1 normal HCl solution. This red-emitting phosphor exhibits a brightness level in plaque tests or in fluorescent lamps, which is comparable to or better than the brightness level previously achieved only with europium-activated yttrium oxide phosphor prepared by an oxalate precipitation method.

The brightness level is measured by a plaque brightness technique whereby a coating of the phosphor on a flat plate is excited by 254 mm. radiation and the emission is measured against a control sample. The lumen output of a fluorescent lamp incorporating the present phosphor is comparable to the lumen output of a lamp using such a phosphor prepared by the oxalating method.

In the foregoing specific example, the zinc chloride can be substituted for ammonium chloride in whole or in part; for example, about 19 grams of $NH_4Cl$ is substituted for the zinc chloride and the raw mix is fired to prepare the phosphor. The phosphor brightness is comparable to that achieved using the $ZnCl_2$ flux.

It is well known that the ratio of europium oxide to yttrium oxide in the raw mix can be varied in producing the phosphor and the present method can be used to improve any of such phosphor. In the foregoing examples the phosphor comprises about 93.7 mole percent $Y_2O_3$ and about 6.3 mole percent $Eu_2O_3$. This phosphor is advantageously used as a red-emitting component of a phosphor blend for use in fluorescent lamps wherein conventional halophosphate phosphor is the main component of the blend.

The firing temperature of the specific example expresses a preferred value for optimizing the brightness of the phosphor. This temperature can be varied from about 1150° to 1400° C. in preparing bright phosphors. The firing time can be varied also, with the firing time at the higher temperatures being at least two hours, and with the lower the firing temperature the longer the firing time.

In the foregoing examples, the chlorine-containing fluxes, zinc chloride and ammonium chloride, were added to the raw mix in amounts such that chlorine portion of the chloride flux was present in an amount of about 10%, and 5% by weight respectively of the europium-yttrium oxides. The chlorine content of the flux as used in the raw mix is preferably 10% by weight of the europium-yttrium oxides. The brightness level is still good when the chlorine content of the flux as used in the raw mix is at least 1% by weight of the europium-yttrium oxides. While such chlorine content can be increased, no brightness advantage is realized by exceeding the 10% by weight ratio.

The acid washing step is not critical in the preparation of the very bright luminescent mixed rare-earth metal oxides, but rather has been found useful in further optimizing the brightness of phosphors prepared according to the present invention.

It is to be understood that while the invention has been described using a specific embodiment, the invention is not to be limited thereto or thereby.

I claim as my invention:

1. Method of preparing europium-activated yttrium oxide phosphor composition, which method comprises:
   (a) mixing predetermined amounts of europium and yttrium oxides in the molar ratio as desired in said phosphor;
   (b) adding to said mixed europium-yttrium oxides a chlorine-containing flux of the group consisting of zinc chloride, ammonium chloride, or mixtures thereof in such amount that the chlorine in said flux constitutes at least one percent by weight of said europium-yttrium oxides;
   (c) firing said resulting mixture at a predetermined temperature for a predetermined time in a covered crucible or in at atmosphere comprising oxygen.

2. The method as specified in claim 1, wherein said yttrium oxide and europium oxide are mixed in the respective mole percentages of about 93.7:6.3, and said flux is zinc chloride in an amount such that chlorine is present in an amount of about 10 percent by weight of said yttrium and europium oxides.

3. The method as specified in claim 1, wherein said firing is at from about 1150° to 1400° C. for at least two hours.

4. The method as specified in claim 1, wherein said resulting mixture is fired at about 1300° C. for about six hours.

5. The method as specified in claim 1, wherein said europium-activated yttrium oxide phosphor composition is washed in a selected acid solution to further improve the luminescent brightness.

6. The method as specified in claim 5, where in said acid solution is a 0.1 normal HCl solution.

References Cited
UNITED STATES PATENTS 3,457,184   7/1969   Kobayashi et al. ____ 252—301.4

TOBIAS E. LEVOW, Primary Examiner

R. D. EDMONDS, Assistant Examiner